United States Patent [19]

Rukavina et al.

[11] Patent Number: 5,648,149
[45] Date of Patent: Jul. 15, 1997

[54] ADHESION OF THERMOSET POLYURETHANE TO RIGID TRANSPARENT SUBSTRATES

[75] Inventors: Thomas G. Rukavina, Lower Burrell; John B. Slobodnik, New Kensington, both of Pa.

[73] Assignee: PPG Industries, Inc., Pittsburgh, Pa.

[21] Appl. No.: 398,931

[22] Filed: Mar. 6, 1995

Related U.S. Application Data

[63] Continuation-in-part of Ser. No. 219,336, Mar. 29, 1994, abandoned.

[51] Int. Cl.$^6$ .............................. B32B 7/02; B32B 27/30; B32B 27/40
[52] U.S. Cl. .................. 428/215; 428/213; 428/214; 428/412; 428/424.2; 428/424.4; 428/515; 428/520
[58] Field of Search .............................. 428/213, 214, 428/215, 412, 424.2, 424.4, 515, 520

[56] References Cited

U.S. PATENT DOCUMENTS

| | | | |
|---|---|---|---|
| Re. 34,523 | 1/1994 | Daude et al. | 428/423.3 |
| 4,177,099 | 12/1979 | Radzwill | 156/99 |
| 4,335,187 | 6/1982 | Rukavina et al. | 428/412 |
| 4,355,053 | 10/1982 | Nezu et al. | 427/516 |
| 4,434,284 | 2/1984 | Rukavina et al. | 528/58 |
| 4,435,450 | 3/1984 | Coleman | 427/385.5 |
| 4,554,318 | 11/1985 | Rukavina | 525/118 |
| 4,609,703 | 9/1986 | Rukavina | 524/360 |
| 4,642,247 | 2/1987 | Mouri et al. | 427/214 |
| 4,670,350 | 6/1987 | Rukavina | 428/520 |
| 4,725,501 | 2/1988 | Rukavina et al. | 428/412 |
| 4,731,289 | 3/1988 | Coleman | 428/334 |
| 4,816,288 | 3/1989 | Rukavina et al. | 427/387 |
| 4,857,386 | 8/1989 | Butters et al. | 428/206 |
| 4,857,407 | 8/1989 | Coleman et al. | 428/412 |

FOREIGN PATENT DOCUMENTS

| | | | |
|---|---|---|---|
| 2529559 | 1/1984 | France . | |

OTHER PUBLICATIONS

Chemical Abstracts, vol. 91, No. 20, 12 Nov. 1979, Abstract No. 159152b, p. 78.

*Primary Examiner*—D. S. Nakarani
*Attorney, Agent, or Firm*—Donna L. Seidel; Donald C. Lepiane; Raymond J. Harmuth

[57] ABSTRACT

The purpose of the present invention is to provide novel primer compositions for use in bonding a thermoset polyurethane film to the surface of a polymeric substrate. The novel primer composition of the invention is an elastomeric polymer, particularly polyvinylpyrrolidinone, or a copolymer comprising vinylpyrrolidinone and alkyl acrylate or alkyl methacrylate. The construction of the article of the present invention comprises a transparent polymeric substrate, such as stretched acrylic, a primer layer of polyvinylpyrrolidinone or copolymer of vinylpyrrolidinone and alkyl acrylate or alkyl methacrylate on a surface thereof, and a film of thermoset polyurethane on the primer layer. The polyurethane is preferably a reaction product of isocyanate and a polyol such as polycaprolactone polyol, hexanediol carbonate polyol, cyclohexanedimethanol carbonate polyol, phthalate ester polyol, and hexanediol/cyclohexanedimethanol carbonate polyol. The effect of the primer composition of the present invention is to provide adequate adhesion of the thermoset polyurethane film to the polymeric substrate, such as stretched acrylic. The resulting article is particularly useful as an aircraft cabin window.

19 Claims, No Drawings

ADHESION OF THERMOSET POLYURETHANE TO RIGID TRANSPARENT SUBSTRATES

CROSS REFERENCE TO RELATED APPLICATION

This application is a continuation-in-part of U.S. application Ser. No. 08/219,336 filed Mar. 29, 1994 now abandoned.

BACKGROUND OF THE INVENTION

This invention relates generally to the art of laminated transparencies, and more particularly to the art of plastic transparencies comprising rigid plastic substrates, most particularly to the art of bonding thermoset polyurethane films to rigid plastic substrates, especially stretched acrylic, for aircraft transparencies.

U.S. Pat. No. 4,335,187 to Rukavina and Maryland discloses a method for bonding metal to polycarbonate by means of a polyurethane adhesive which comprises an isocyanate-terminated polyester urethane crosslinked with a trifunctional compound such as triisopropanolamine.

U.S. Pat. No. 4,434,284 to Rukavina and Coleman discloses polyurethane formulations for large scale casting wherein the polyol component is solubilized in the isocyanate component to lower the required mixing temperature so that the formulation will have a relatively long pot life, and can be cast on e.g. polycarbonate and cured sufficiently fast to avoid attack of the polycarbonate surface by the isocyanate.

U.S. Pat. No. 4,435,450 to Coleman discloses a method for applying a thin abrasion resistant polyurethane coating on rigid transparent substrates, such as polycarbonate or acrylic, or on resilient plastic layers such as impact resistant polyurethane, useful as aircraft transparencies.

U.S. Pat. Nos. 4,554,318; 4,609,703 and 4,670,350 to Rukavina disclose novel copolymers of acrylic acid and cyanoethylacrylate, including terpolymers with hydroxyethylacrylate, useful as primers for bonding metal-containing coatings to organic polymer substrates.

U.S. Pat. No. 4,725,501 to Rukavina and Lin discloses a silicate/titanate copolymer for use as a primer to adhere rigid polymer substrates to elastomeric interlayers or inorganic coatings, particularly stretched acrylic or metal-oxide coated stretched acrylic to a vinyl interlayer or siloxane coating.

U.S. Pat. No. 4,731,289 to Coleman discloses resilient abrasion resistant branched polyurethane coatings deposited on rigid plastic substrates such as acrylic or polycarbonate to form coated plastics especially useful as aircraft transparencies.

U.S. Pat. No. 4,857,407 to Coleman and Rukavina discloses a low shear modulus thermoplastic polyurethane useful in laminating rigid plies with different coefficients of thermal expansion without warpage; for example, laminating materials such as polycarbonate or acrylic and glass for use in aircraft windshields and other transparencies.

SUMMARY OF THE INVENTION

The present invention comprises novel primer compositions to bond a thermoset polyurethane film to a surface of a polymeric substrate. The present invention provides primers comprising polymers such as polyvinylpyrrolidone and copolymers of vinylpyrrolidone and acrylate monomers which promote adhesion of thermoset polyurethane films on polymer substrates, particularly rigid transparent substrates such as stretched acrylic, for use as transparencies, particularly in aircraft.

DESCRIPTION OF PREFERRED EMBODIMENTS

The polymeric substrate primed with the compositions of the present invention is preferably a rigid transparent material suitable for forming laminates which may be used as transparencies in aircraft, such as polycarbonates, polyacrylates and polyurethanes. A preferred rigid transparent polymer substrate for aircraft transparencies is stretched acrylic. Stretched acrylic is a biaxially oriented plastic made from crosslinked polymethamethacrylate. The oriented plastic preferably has a modulus of elasticity on the order of $4.9 \times 10^5$ pounds per square inch, and a tensile strength of 13,000 to 14,000 pounds per square inch. The thickness of such a substrate may vary over a broad range depending on the number and composition of other layers in a laminated article. Typically, for an aircraft transparency, a stretched acrylic substrate has a thickness in the range of 0.125 to 1 inch (about 3 to 25 millimeters).

The thermoset polyurethane film is preferably a thin transparent liner laminated to the exposed surface of a rigid transparent substrate. The polyurethane is preferably a reaction product of isocyanate with a polyol. Preferred isocyanates include aliphatic diisocyanates, aromatic diisocyanates and aromatic triisocyanates. Polyols can be polyester or polyether polyols with number average molecular weights from about 250 to 2000, preferably from 650 to 1500. Preferred polyols include polycaprolactone polyols, hexanediol carbonate polyol, cyclohexanedimethanol carbonate polyol, phthalate ester polyol, hexanediol/cyclohexanedimethanol carbonate polyol and mixtures thereof. Preferred polycaprolactone polyols have a molecular weight in the range of 800 to 2000. A preferred polyol may comprise hexanediol carbonate polyol cyclohexane dimethanol carbonate polyol and mixtures therefore. The polyurethane compositions preferably further comprise a short chain diol. Various short chain diols from $C_2$ to $C_8$ may be used, preferably from $C_2$ to $C_6$. Also, cyclic aliphatic or aromatic diols may be used, particularly with molecular weights of 144 to 400, preferably 144 to 300. The polyurethane composition may also further comprise a triol for crosslinking, particularly triols with molecular weights from 100 to 2000, preferably from 134 to 1200. Polyurethane compositions and reactants are described in detail in the above cited references, the disclosures of which are incorporated herein by reference.

The primer of the present invention is disposed at the interface of the rigid plastic substrate and a thermoset polyurethane film to provide adequate adhesion of the thermoset polyurethane film to the rigid plastic substrate. The primer of the present invention is an elastomeric polymer which is a good film former, and is transparent and colorless, preferably a polymer of vinylpyrrolidone.

Polyvinylpyrrolidone is preferably used in the number average molecular weight range of about 40,000 to 200,000. Preferred are polymers of vinylpyrrolidone copolymerized with hydrophobic monomers such as polyalkylacrylates and methacrylates, preferably methyl acrylate, butyl acrylate, ethylhexyl acrylate and the corresponding methacrylates of the above acrylates. While linear alkyl acrylates are preferred, alkylacrylates with alkyl side chains from $C_1$ to $C_{10}$, preferably from $C_1$ to $C_8$, may also be copolymerized with vinylpyrrolidone. A copolymer of vinylpyrrolidone and butyl acrylate is particularly preferred, preferably having a molar ratio of comonomers in the range of 1:1 to 3:1.

The primer is preferably applied to the substrate surface as a solution by dip, spin, spray, flow or other conventional application technique. The solvent is then evaporated, and the primer cured at slightly elevated temperature. The primer composition preferably comprises organic solvent, preferably organic solvent which does not cause degradation of the substrate surface, preferably alcohols and ketones. The solvent may be n-butanol, cyclohexanone, acetone, and mixtures of such solvents, and is preferably n-butanol. The solution preferably comprises about 10 percent polymer. A preferred method of applying the primer is flow coating onto a plastic substrate surface, drying and curing at elevated temperature, typically in the range of about 150° to 180° F. (about 65° to 82° C.), preferably about 180° F. for about 30 minutes. The thickness of the primer is preferably in the range of about 0.01 to 0.50 microns, more preferably about 0.29 to 0.46 microns for optimum adhesion.

The polyurethane composition is then preferably cast and cured on the primer coated rigid transparent plastic substrate surface. The polyurethane is preferably an aliphatic thermoset polyester urethane with a molecular weight per crosslink between 10,000 and 2000 grams per mole. The polyurethane is preferably a reaction product of isocyanate, preferably aliphatic diisocyanate, and a polyol, preferably a polyester polyol such as polycaprolactone polyol, preferably with a molecular weight in the range of 800 to 2000, hexanediol carbonate polyol, cyclohexanedimethanol carbonate polyol, phthalate ester polyol, hexanediol/cyclohexanedimethanol carbonate polyol and mixtures thereof, preferably hexanediol carbonate polyol, cyclohexanedimethanol carbonate polyol and mixtures thereof. The polyurethane reaction mixture preferably further comprises a short chain diol. Various short chain diols from $C_2$ to $C_8$ may be used, preferably from $C_2$ to $C_6$. Also, cyclic aliphatic or aromatic diols may be used, particularly with molecular weights of 144 to 400, preferably 144 to 300. The polyurethane reaction mixture preferably also comprises a triol for crosslinking, particularly triols with molecular weights from 100 to 2000, preferably from 134 to 1200. The thickness of the thermoset polyurethane film is typically in the range of 0.01 to 0.05 inch (0.025 to 1.3 millimeter), preferably 0.02 to 0.03 inch (0.5 to 0.8 millimeter). The primer of the present invention promotes adhesion of thermoset polyurethane films on rigid transparent substrates such as stretched acrylic for use as aircraft transparencies.

The adhesion of the thermoset polyurethane to the rigid plastic substrate, such as stretched acrylic, is measured with an Instron testing machine Model No. 1127 using ASTM procedure D3167 to determine the 90° angle peel strength. Peel strengths at ambient temperatures are generally determined by cohesive failure of the polyurethane, i.e. the polyurethane itself separates rather than debond from the substrate. The present invention will be further understood from the descriptions of specific examples which follow:

EXAMPLE 1

A solution was prepared comprising 2.5 grams of polyvinylpyrrolidone (number average molecular weight of 40,000) and 22.5 grams of butanol. The polymer solution was then applied to a sheet of stretched acrylic plastic 0.5 inch (1.27 centimeter) thick using a flow coating method. The solvent was evaporated at 82° C. for one hour to yield a high optical quality primed plastic sheet. A thermosetting polyurethane composition comprising aliphatic diisocyanate, polyester polyol, short chain diol and triol was cast onto the primed plastic and cured at 82° C. for 18 hours. Cure was determined by the disappearance of the isocyanate absorption band at 2260 $cm^{-2}$ in the infrared spectrum. The resulting thermoset polyurethane film was 0.02 inch (0.5 millimeter) thick. The resulting composite was subsequently formed to the shape of an aircraft cabin window which exhibited excellent optical quality, including light transmission of over 90 percent. The composite laminate was tested for 90° peel strength using the Instron machine and ASTM procedure described earlier. The crosshead speed was 2 inches (5 centimeters) per minute. Adhesion was sufficiently high to cause cohesive failure of the polyurethane during a 90° peel test at ambient temperature. The initial 90° peel strength was 247 pounds per linear inch (pli). After soaking the composite in water for 4 hours, the 90° peel test was repeated, and the peel strength was only 12 pli, indicating less water resistance than desired for the primer.

EXAMPLE 2

A solution was prepared comprising 19.02 grams of vinylpyrrolidinone and 10.95 grams of butyl acrylate. Nine drops of diethoxyacetophenone were added as initiator. The mixture was flow coated onto a 0.5 inch thick stretched acrylic substrate and cured with a mercury lamp UV light source for two minutes. An aliphatic polyester thermosetting polyurethane reaction mixture was cast and cured on the primed plastic surface for 12 hours at 180° F. (82° C.) resulting in a thermoset polyurethane layer 0.03 inch (0.76 millimeter) thick with a molecular weight per crosslink of 5350. The 90° peel tests yielded cohesive failure of the polyurethane at 235 pli. After a 4 hour room temperature water soak, the 90° peel strength was measured at 85 pli, indicating that water-resistance is much improved over that of Example 1.

EXAMPLE 3

A solution was prepared comprising 13.90 grams of vinylpyrrolidinone and 16.07 grams of butyl acrylate. To this mixture, 9 drops of diethoxyacetophenone were added as initiator. The mixture was flow coated onto a 0.125 inch (3 millimeter) stretched acrylic plastic substrate and UV-cured using a mercury lamp. An aliphatic polyester thermosetting polyurethane composition was cast and cured on the primed plastic surface for 12 hours at 180° F. (82° C.). The thermoset polyurethane had a molecular weight per crosslink of 8350 grams per mole. A 90° peel test yielded cohesive failure of the polyurethane at 185 pli. After a 4 hour ambient temperature water soak, the peel strength was 147 pli, indicating that water-resistance is better than in Examples 1 and 2.

The above examples are offered to illustrate the present invention, the scope of which is defined by the following claims. Various other materials and process conditions may be used. For example, while the examples utilize stretched acrylic substrates, other substrates can be used, such as linear as-cast polymethylmethacrylate, crosslinked as-cast polymethylmethacrylate, polycarbonate, and polymers of CR-39® monomer. Various polyurethane compositions may also be used in the transparencies of the present invention. While the polyurethanes of the examples were prepared from aliphatic diisocyanates, aromatic isocyanates may also be used. Polyols can be polyester or polyether polyols with number average molecular weights from about 250 to 2000, preferably from 650 to 1500. Various short chain diols from $C_2$ to $C_8$ may be used, preferably from $C_2$ to $C_6$. Also, cyclic aliphatic or aromatic diols may be used, particularly with molecular weights of 144 to 400, preferably 144 to 300. Triols may be used, particularly with molecular weights from 100 to 2000, preferably from 134 to 1200. Copolymers of vinyl pyrrolidinone and hydrophobic monomers such as methyl acrylate, butyl acrylate, ethylhexyl acrylate, and the corresponding methacrylates of each acrylate are disclosed, but other polyalkylacrylates and methacrylates may be used. While linear alkyl acrylates are preferred, alkylacrylates with alkyl side chains from $C_1$ to $C_{10}$, preferably from $C_1$ to $C_8$, may also be used. These and other variations and modifications are within the scope of the present invention as defined by the following claims.

We claim:

1. In an aircraft transparency comprising a rigid transparent stretched acrylic substrate having a surface; a thermoset polyurethane film, and means for securing the substrate and the film together, the improvement to the means for securing comprising a primer layer directly adhered to said surface of said substrate, said primer layer comprising a polyvinylpyrrolidone or a copolymer of vinylpyrrolidone and monomer selected from the group consisting of alkylacrylate, alkylmethacrylate, and mixture thereof.

2. The aircraft transparency according to claim 1, wherein said primer layer is polyvinylpyrrolidone.

3. The aircraft transparency according to claim 1, wherein said primer layer is a copolymer of vinylpyrrolidone and monomer selected from the group consisting of alkylacrylate, alkylmethacrylate, and mixture.

4. The aircraft transparency according to claim 3 wherein said primer layer is a copolymer of vinylpyrrolidone and butyl acrylate.

5. The aircraft transparency according to claim 1, wherein said polyurethane film is a reaction product of isocyanate with a polyol selected from the group consisting of polycaprolactone polyol, hexanediol carbonate polyol, cyclohexanedimethanol carbonate polyol, phthalate ester polyol and hexanediol/cyclohexanedimethanol carbonate polyol.

6. The aircraft transparency according to claim 5, wherein said polyurethane film is a reaction product of isocyanate with a polyol selected from the group consisting of hexanediol carbonate polyol, cyclohexanedimethanol carbonate polyol and mixtures thereof.

7. The aircraft transparency according to claim 1, wherein said rigid transparent substrate has a thickness in the range of 0.125 to 1.0 inch (0.31 to 2.54 centimeters); said primer layer has a thickness in the range of 0.01 to 0.5 microns; and said thermoset polyurethane film has a thickness in the range of 0.01 to 0.05 inch (0.0254 to 0.127 centimeter).

8. The aircraft transparency according to claim 7, wherein said primer layer is from 0.29 to 0.46 microns thick.

9. The aircraft transparency according to claim 7, wherein said polyurethane film is the reaction product of an isocyanate and a polyol selected from the group consisting of polycaprolactone polyol, hexanediol carbonate polyol, cyclohexanedimethanol carbonate diol, phthalate ester polyol and hexanediol/cyclohexanedimethanol carbonate polyol.

10. The aircraft transparency according to claim 9, wherein said polyurethane film is the reaction product of an isocyanate and a polyol selected from the group consisting of hexanediol carbonate polyol, cyclohexanedimethanol carbonate polyol, hexanediol/cyclohexanedimethanol carbonate polyol and mixtures thereof.

11. The aircraft transparency of claim 1 wherein the rigid transparent stretched acrylic substrate has a thickness in the range of 0.125 to 1.0 inch (0.32 to 2.54 centimeters);

the primer layer has a thickness in the range of 0.01 to 0.5 microns and is a copolymer of vinylpyrrolidone and a monomer selected from the group consisting of alkylacrylate, alkylmethacrylate, and mixture thereof; and the thermoset polyurethane film has a thickness in the range of 0.01 to 0.05 inch (0.0254 to 0.127 centimeter).

12. The aircraft transparency according to claim 11 wherein said primer layer is a copolymer of vinylpyrrolidone and of butyl acrylate.

13. The aircraft transparency according to claim 12 wherein said primer layer provides said article with a peel strength of about 85 to 147 pounds per linear inch, determined by soaking said article in water for four hours at ambient temperature and thereafter conducting a 90° peel test using ASTM Procedure D3167 on the polyurethane film.

14. The aircraft transparency according to claim 1 wherein said primer layer provides said transparency with a peel strength of about 85 to 147 pounds per linear inch determined by soaking said article in water for four hours at ambient temperature and thereafter conducting a 90° peel test using ASTM Procedure D3167 on the polyurethane film.

15. An article of manufacture comprising:

a rigid transparent stretched acrylic substrate having a surface;

a primer layer directly adhered to said surface of said substrate, said primer layer consisting essentially of a polymer selected from the group consisting of polyvinyl pyrrolidone and a copolymer of vinyl pyrrolidone and a monomer selected from the group consisting of alkylacrylate, alkylmethacrylate, and mixture thereof; and a thermoset polyurethane film adhered to said primer layer wherein said article of manufacture is a laminated aircraft transparency.

16. The aircraft transparency according to claim 15, wherein said primer layer is polyvinylpyrrolidone.

17. The aircraft transparency according to claim 15, wherein said primer layer is a copolymer of vinylpyrrolidone and a monomer selected from the group consisting of alkylacrylate, alkylmethacrylate, and mixture thereof.

18. The aircraft transparency according to claim 15, wherein said primer layer is a copolymer of vinylpyrrolidone and of butyl acrylate.

19. The aircraft transparency according to claim 15, wherein said primer layer provides said article with a peel strength of about 85 to 147 pounds per linear inch determined by soaking said article in water for four hours at ambient temperature and thereafter conducting a 90° peel test using ASTM Procedure D3167 on the polyurethane film.

* * * * *